Nov. 19, 1968     G. URBAN ETAL     3,411,896

METHOD AND APPARATUS FOR REFINING OPERATIONS

Filed March 2, 1966

Inventors:
Günter Urban
Friedrich Fillies

By: Spencer & Kaye
Attorneys

United States Patent Office 3,411,896
Patented Nov. 19, 1968

3,411,896
METHOD AND APPARATUS FOR
REFINING OPERATIONS
Günter Urban, Essen, Margarethenhohe, and Friedrich Fillies, Niederwenigern, Germany, assignors to Beteiligungs- und Patentverwaltungsgesellschaft mit beschrankter Haftung, Essen, Germany
Filed Mar. 2, 1966, Ser. No. 531,190
Claims priority, application Germany, Mar. 4, 1965, P 14 58 814.8
9 Claims. (Cl. 75—60)

ABSTRACT OF THE DISCLOSURE

Method and apparatus for cooling and purifying exhaust gases emanating from metallurgical refining operations. The exhaust gases serve to preheat additional material to be refined. The material, which is in the form of individual pieces with interstices between them, is arranged in a preheating shaft and is discharged, after preheating, in a given direction. The exhaust gases are first cooled and then passed through the interstices of the additional material in substantially the same direction in which the material is ultimately discharged. The material is thus preheated and the exhaust gases simultaneously purified.

The present invention relates to a method and apparatus for metallurgical refining operations, and more particularly, for cooling and purifying the exhaust gases emanating from oxygen injection converters used in such operations and wherein the exhaust gases serve for preheating additional substances, such as scrap metal.

The exhaust gases from metallurgical refining operations are generally used, either with or without the addition of secondary air, for preheating additional substances, for the reduction of iron ore, for burning lime, or for sintering iron ore or crude magnesite. According to the prior art arrangements, it has been proposed to cool the exhaust gases in boilers formed either with or without convection surfaces. It is also known to lower the exhaust gas temperature by means of a brick regenerator or by water injection, after the gases pass a radiating cooling surface. In metallurgical refining operations, large quantities of exhaust gas are formed so that substantial expenditures are made for providing means to purify the exhaust gases. The purifying or the removing of dust from the exhaust gases is necessitated since particles of the material being refined are carried by the gases and it is desirable to remove such particles prior to discharging the exhaust gases into the atmosphere. In order to lessen the expenditure, some prior art arrangements attempt to reduce the quantity of exhaust gases produced by refining the material in the presence of a small amount of air or with the exclusion of air.

In a known arrangement, the scrap material is preheated with the aid of the resultant exhaust gases from the metallurgical refining operation. In this arrangement, the preheating chambers containing the scrap material are positioned in such a manner that the exhaust gases being formed, directly impinge upon the material. Thus, the exhaust gases which are generally at a temperature of approximately 1800° C. provide such an intense heat at the surface of the mass of scrap material, which is constituted of individual pieces between which there are interstices, that the surface of the scrap melts. Due to this melting, the interstices between the scrap pieces become sealed and the scrap pieces are fused together in the form of a large mass such that the scrap disposed beneath the surface of the mass can no longer be heated. Accordingly, the melting of the scrap at the surface causes the heat conductivity of the scrap to lessen during subsequent melting operations so that long melting times are required to completely melt the scrap.

It is therefore an object of the present invention to provide a method and apparatus for metallurgical refining operations which overcome some of the disadvantages of prior art arrangements.

It is another object of the present invention to provide a method for cooling and purifying the exhaust gases formed in a metallurgical refining operation.

It is a further object of the present invention to provide apparatus for cooling and purifying the exhaust gases formed in a metallurgical refining operation.

With the above objects in view, the method of the present invention is carried out by cooling the exhaust gases, passing the gases through interstices of the scrap material which is to be added to the refining bath or other additional substances to be added for preheating such material, and during the preheating, simultaneously performing a preliminary purification of the exhaust gases.

According to the present invention, there is provided a cooling flue for conducting the exhaust gases from a refining vessel to a preheating shaft, with the cooling flue preferably forming the radiating heating surface of a steam generator. The preheating shaft extends downwardly and may be either arranged perpendicularly or diagonally from top to bottom with the outlet end being connected to a dust collecting unit in which exhaust gases are further purified. Furthermore, the preheating shaft is provided with means for receiving material to be added to the refining bath and means for directly discharging the preheated material into the refining bath.

Additional objects and advantages of the present invention will become apparent upon consideration of the following description when taken in conjunction with the accompanying drawings in which.

Figure 1:
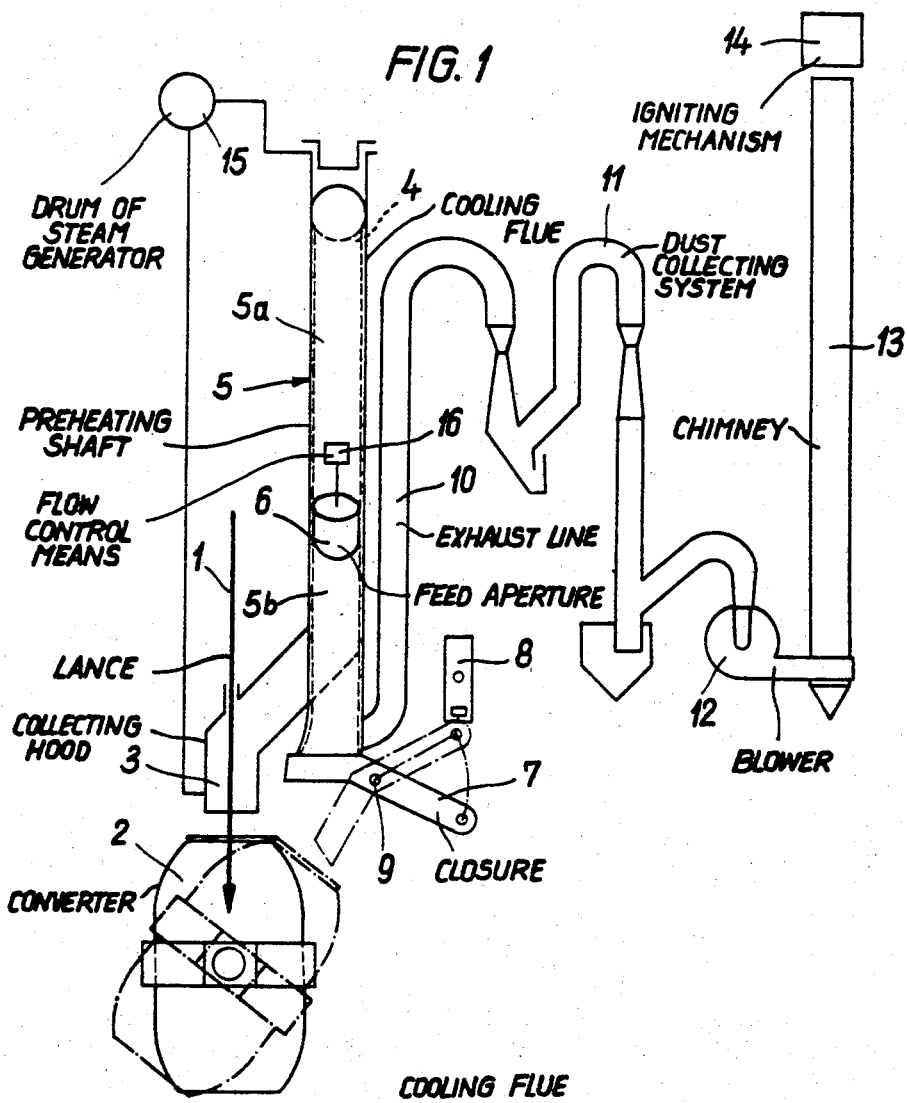
FIGURE 1 is a schematic lateral view of the apparatus according to the present invention.

Referring now to the drawings, there is shown in FIGURE 1 a metallurgical refining arrangement and including a converter 2 in which the material to be refined is melted. For example, when refining iron, a crude iron bath is formed within the converter and oxygen is blown onto the bath with the aid of an oxygen injection lance 1. The reaction of the oxygen with the elements of the crude iron bath causes exhaust gases to be formed which rise from the bath and are intercepted by means of a gas collector hood 3 arranged above the converter 2. The hood 3 may be equipped with a device for preventing the entrance of primary air into the system, which device is not shown.

Figure 2:
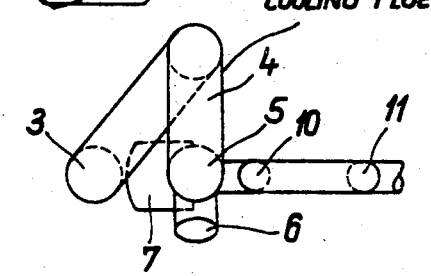
FIGURE 2 is a top plan view of a portion of the apparatus of FIGURE 1 showing the cooling flue, the preheating shaft, and a portion of the dust collecting system.

The exhaust gases are conveyed from the collecting and cooling hood 3 into a cooling flue 4, shown in FIGURE 2, which forms the radiating heating surface for a steam generator (not shown) with a drum 15, so that a cooling of the gases takes place within the hood and the flue to an extent such that the gases exit from the flue at a temperature of approximately 1000° C. Thus, the temperature of the exhaust gases is substantially lowered from the 1800° C. temperature at which the gases exit from the converter. The waste gases are advantageously carried from the top of the flue 4 into a noncooled shaft 5 which is lined with a refractory material or alternatively has an upper cooled part which serves as a part of the radiation heating surface. The preheating of the scrap or other additional material within the lower part of the shaft 5, may take place in the presence of no air, a small amount of air, with a maximum amount of $CO_2$, or with an excess of air.

The preheating shaft 5 extends in a downward direction and is shown in a vertical position. However, the shaft may also be arranged in any substantially vertical position such that the shaft extends diagonally from top to bottom. The preheating shaft 5 is provided with a feeding aperture 6 through which the mass of scrap material or other material to be preheated, which mass is constituted of individual pieces between which there are interstices, is inserted into the shaft. The portion of the shaft 5 which is arranged below the feeding aperture, that is, portion 5b, is advantageously provided with a steel jacket or a like strengthening structure so as to prevent excessive wear and tear of the shaft below the feeding aperture. The bottom of the preheating shaft 5 is provided with a conical widening and is equipped with a closure 7 which may be hydraulically actuated.

The closure 7 is advantageously formed as a discharge chute member and is driven by means of a hydraulic actuating mechanism 8 which causes the closure to pivot about a member 9. The closure 7 bears against the member 9 and is rigidly connected to the actuating mechanism 8, but advantageously has no rigid connection with the preheating shaft 5. Thus, an expansion of the preheating shaft 5 which results from the strong mechanical and thermal stresses incurred within, will not impair the effectiveness of the closure 7. Furthermore, the closure 7 is formed with a water seal so that a gas-tight closing of the preheating shaft 5 may advantageously be obtained.

The exhaust gases flow downwardly from the top to the bottom of the preheating shaft and pass through the interstices of the material contained therein and thus heat the material. After the blow, the scrap or other material has reached the desired temperature and the refined metal is then tapped. After tapping the converter 2, as shown in dash-dot lines in FIGURE 1, is pivoted under the preheating shaft 5 and the preheated scrap is discharged directly into the converter 2 by opening the closure 7 to the position shown in dash-dot lines. When the filling operation is completed, the closure 7 which serves as the discharge chute is pivoted upwardly to again close the preheating shaft and additional scrap is fed into the shaft through the feeding aperture 6.

The exhaust gases which were prepurified and cooled by the scrap in that some of the dust particles were removed and a heat exchange occurred when the gases flowed through the interstices of the scrap, are conveyed from the bottom of the preheating shaft 5 through an exhaust line 10 to a dust collecting system 11 in which the dust is removed by a conventional wet process operation. A controllable suction draft blower 12 is connected to the dust collecting system 11 and draws the exhaust gases from the system into a chimney 13 from which the gases are discharged into the atmosphere. In case of none or partial combustion within the plant, a gas igniter mechanism 14 is provided at the outlet of the chimney 13 for igniting the exhaust gases which exit from the chimney, so as to completely burn these gases before they enter the atmosphere.

According to the present invention, it is also possible to employ a dust collecting system operating with other processes, for example, a dry electrofiltering process for purifying the exhaust gases. In addition, other modifications may be made to the different structures employed in the arrangement of the present invention. For example, instead of the refractory lining of the upper shaft portion 5a of the preheating shaft, there is installed a radiating cooling surface to further cool the exhaust gases. Also, in order to prevent premature destruction of the lower shaft portion 5b which is lined with a steel jacket, this portion is advantageously cooled by any suitable cooling means. Furthermore, the feeding aperture 6 through which the scrap is added to the preheating shaft 5, may advantageously be provided with a flow control means 16 which controls the introduction into the preheating shaft of a controlled or uncontrolled admixture of secondary air, additional fuel, or a cooling media.

Thus, according to the method and apparatus of the present invention, in a metallurgical refining operation having an oxygen injection converter, the crude iron charge in the converter may be reduced and the addition of scrap material can be considerably increased while maintaining the same steel tapping weight. Since the crude iron produces gaseous reaction products, the insertion of preheated scrap material in the converter charge—with the consequent increase in the proportion of scrap in the charge—results in a lower exhaust gas yield than would be the case were cold scrap material employed. As is common in exhaust systems for converters which use preheated scrap, the quantity of exhaust gases may be increased by permitting the partial or, if necessary, complete combustion of the gases through the admission of air. By proper control, therefore, approximately that quantity of exhaust gases can be obtained which would have been produced were cold scrap used and the exhaust gases not permitted to burn or permitted only slight combustion. Consequently, whether cold or heated scrap be inserted in the charge, it is always possible to maintain the quantity of gases flowing through the dust collecting system at a uniform or constant level.

The present invention has the advantage of providing a substantially greater heat gain.

It should also be noted that if instead of preheating scrap, cold ore may be utilized in the present invention so that the crude iron charge increases while the steel tapping weight remains the same. In conjunction with a suitable dust collecting system, the excess air coefficient, $n$, may then be lowered, for example, to $n=0$, until the amount of gas used with the ore equals the amount of gas used with the scrap. Furthermore, the amounts of ore and scrap may be varied between intermediate stages the pure use of ore and, respectively, the pure use of scrap, for example, the amounts may be varied in such a manner that the addition of ore is increased by preheating scrap, as a result of which the consumption of oxygen is reduced.

Further it is possible to use pellets instead of ore in a manner analogous to that described above.

It will be understood that the above description of the present invention is susceptible to various modifications, changes, and adaptations, and the same are intended to be comprehended within the meaning and range of equivalents of the appended claims.

What is claimed is:

1. A method for cooling and purifying exhaust gases which emanate from metallurgical refining operations and in which the exhaust gases serve for preheating additional material to be refined, which material is discharged, in a given direction, from a preheating shaft, comprising the steps of:
    (a) cooling the exhaust gases; and
    (b) passing the cooled exhaust gases through a mass of the additional material to be refined in the same direction in which the material is discharged from said shaft, which mass is constituted of individual pieces between which there are interstices, for preheating the additional material and, in consequence of the flow of the exhaust gases through the interstices, simultaneously prepurifying the exhaust gases.

2. The method as defined in claim 1 wherein the material in the preheating shaft is ore and the cooling and purifying of the exhaust gases is carried out with at most a small partial combustion of the exhaust gases.

3. An arrangement for cooling and purifying waste gases formed in metallurgical refining operations in which the exhaust gases serve for preheating additional materials, comprising in combination:
    (a) a refining vessel in which the exhaust gases are formed and having an opening through which the exhaust gases exit therefrom;

(b) a cooling flue disposed adjacent to the exit opening of said refining vessel for receiving the exhaust gases and for cooling the same;

(c) a downwardly extending preheating shaft for receiving additional material provided with a feeding aperture therein for the insertion of the material to be preheated and having a closable opening at the bottom thereof through which said material may be discharged, said shaft being connected to said cooling flue at a point remote from said opening for receiving the cooled exhaust gases, whereby said gases are conveyed through said preheating shaft in the direction in which said material is discharged; and (d) a dust collecting system connected to said preheating shaft for receiving the exhaust gases therefrom.

4. An arrangement as defined in claim 3, wherein said opening of said preheating shaft is provided with a closure including a closure member forming a discharge chute, an actuating mechanism for driving said closure member and a pivot member on which said closure member rotates, and said closure being free of rigid connection to said preheating shaft.

5. An arrangement as defined in claim 4 wherein said closure forms a gas-tight seal for said shaft.

6. Apparatus as defined in claim 3 wherein said feeding aperture includes means for conveying secondary air, additional fuel or cooling media into said preheating shaft.

7. An arrangement as defined in claim 3 wherein said cooling flue forms the radiating heating surface of a steam generator.

8. An arrangement as defined in claim 3, wherein said preheating shaft extends vertically downward.

9. An arrangement as defined in claim 3, wherein said preheating shaft extends diagonally downward.

References Cited
UNITED STATES PATENTS

| | | | |
|---|---|---|---|
| 3,177,065 | 4/1965 | Okaniwa et al. | 75—60 |
| 3,223,521 | 12/1965 | Stone | 75—60 |
| 3,301,662 | 1/1967 | Ban | 75—60 |
| 3,314,781 | 4/1967 | Johansson et al. | 75—60 |
| 3,326,670 | 6/1967 | Bratton | 75—28 |

RICHARD O. DEAN, *Primary Examiner.*